United States Patent [19]

Sigmund

[11] 4,233,879
[45] Nov. 18, 1980

[54] GROOVED FASTENER

[75] Inventor: Jerry A. Sigmund, Willow Grove, Pa.

[73] Assignee: SPS Technologies, Inc., Jenkintown, Pa.

[21] Appl. No.: 973,334

[22] Filed: Dec. 26, 1978

[51] Int. Cl.³ .................... F16B 19/00; F16B 21/16
[52] U.S. Cl. ........................................................ 85/7
[58] Field of Search ............... 85/1 T, 5 R, 7, 72, 85/77, 78; 29/517

[56] References Cited

U.S. PATENT DOCUMENTS

| 2,396,661 | 3/1946 | Keller et al. | 85/37 |
| 2,542,376 | 2/1951 | Torresen | 151/22 |
| 2,955,505 | 10/1960 | Schuster | 85/5 R |
| 2,972,274 | 2/1961 | Bombard et al. | 85/5 R X |
| 3,241,421 | 3/1966 | Siebol | 85/7 |
| 3,415,553 | 12/1968 | Baugh | 85/7 X |
| 3,483,788 | 12/1969 | Keeler | 85/7 |
| 3,915,053 | 10/1975 | Ruhl | 85/7 |

FOREIGN PATENT DOCUMENTS 2151847  4/1972  Fed. Rep. of Germany ............... 85/7

Primary Examiner—Thomas J. Holko
Attorney, Agent, or Firm—Aaron Nerenberg

[57] ABSTRACT

A fastener which includes an unthreaded bolt member having two groups of grooves formed therein is disclosed. All the grooves within each group have the same depth. The group of grooves furthest from the workpiece have a greater depth than the group of grooves adjacent to the workpiece, thus permitting a more uniform load distribution along the shank of the bolt.

6 Claims, 2 Drawing Figures

GROOVED FASTENER

BACKGROUND OF THE INVENTION

This invention relates generally to fasteners, and more particularly to fasteners of the type wherein a bolt member having grooves therein and a swage collar are used to fasten a member to a workpiece.

Fasteners of this type generally have a series of grooves formed in the shank of the bolt member. The bolt is then passed, for example, through holes in two workpieces which are desired to be secured together. The collar is then placed over the grooved end of the bolt which has passed through the workpiece and is swaged into the grooves on the shank. In order to tightly secure the two workpieces together, the bolt shank is placed in tension. The tension is reacted to at one end of the shank by the bolt head which abuts one of the workpieces and the collar which abuts the other workpiece. The load is transferred from the load bearing surfaces or shoulders formed by the grooves in the shank to the mating load bearing surfaces which are formed in the collar when it is swaged into the grooves of the shank.

It is well known that in conventional grooved fasteners, such as shown, for example, in U.S. Pat. No. 3,645,125, a very high proportion of the load is carried by the load bearing surfaces formed by the first few grooves in the shank adjacent the sheet line of the workpiece. Experience has shown that most structural failures occur in this area of the shank or in the mating region of the collar.

Although this problem has generally been recognized, there are few solutions to the problem disclosed in the prior art. One solution which has been suggested for solving the problem is to increase the distance between and radial depth of each adjacent groove as the distance from the sheet line increases, such as in U.S. Pat. Nos. 2,396,661 and 2,397,076. This configuration, however, is relatively expensive to manufacture and inspect after manufacture.

SUMMARY OF THE INVENTION

The present invention more uniformly distributes the load along the shank of the bolt member by forming two different sets or groups of grooves. The depth of the grooves within each group is constant, with the group furthest from the sheet line having a greater depth than the group closest to the sheet line. In this manner the load bearing surfaces formed by the more distant group bear a portion of the load which would normally be taken up by the first few grooves in the group adjacent to the sheet line. Although the depth of the grooves within each group is constant and there is a difference in depth between the two groups of grooves, other groove parameters may vary. For example, the space between adjacent grooves and the two groups of grooves may vary, as well as the particular shape of the grooves.

Accordingly, it is an object of the present invention to provide a new and improved fastener having a shank with grooves therein adapted to have a collar swaged into the grooves wherein the axial load borne by the shank is more uniformly distributed along its length.

Another object of the present invention is to provide a fastener having a grooved shank which is adapted to receive a collar which is swaged into the grooves wherein a substantial portion of any axial load borne by the shank is carried by the load bearing surfaces of the grooves beyond the two grooves adjacent to the sheet line.

Another object of the present invention is to provide a fastener including a bolt member having a shank with two groups of adjacent grooves therein where the depth of the group of grooves furthest from the sheet line is greater than the group of grooves adjacent the sheet line, thereby providing a more uniform distribution of any axial load borne by the shank.

Another object of the present invention is to provide a fastener including a bolt member having a shank with two groups of adjacent grooves therein where the depth of the group of grooves furthest from the sheet line is greater than the group of grooves adjacent the sheet line, wherein the tensile strengths attainable are at least comparable to competitive grooved fasteners while offering cost advantages in manufacturing and inspection after manufacture.

Other objects and a fuller understanding of the invention will be had by reference to the following description and claims of the preferred embodiment thereof taken in conjunction with the accompanying drawings wherein like reference characters refer to like or similar parts throughout.

DESCRIPTION OF THE PREFERRED EMBODIMENT

Figure 1:
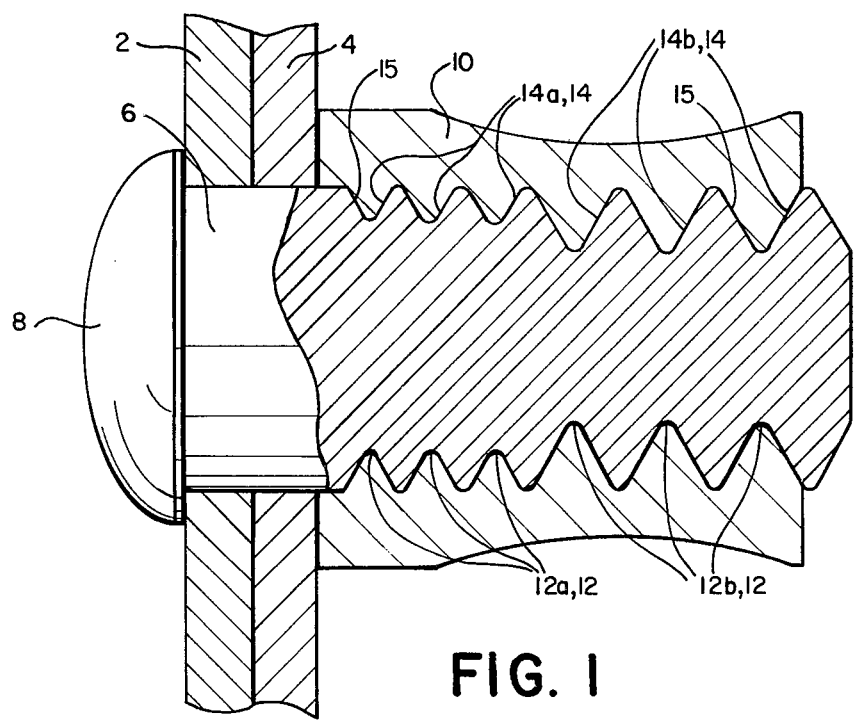
FIG. 1 is a side view of a grooved fastener assembly in accordance with the present invention, partially broken away, showing two workpieces secured together.

A fastener of the present invention is shown in FIG. 1 securing workpieces 2 and 4 together. The fastener includes a shank 6 having a head 8 formed at one end thereof. Head 8 and shank 6 generally form an integral bolt. It is to be understood that a variety of different head 8 configurations may be used, and the particular head configuration illustrated is merely representative. A collar 10 is shown swaged into circumferential grooves 12, which have been formed in shank 6. Adjacent each groove, facing the workpiece, are load bearing surfaces or shoulders 14.

In connecting workpieces 2 and 4 together, shank 6 is inserted into holes formed in the workpieces until head 8 abuts workpiece 2. Collar 10 is then slipped over shank 6. Although not specifically illustrated, the grooved fasteners of the present invention include a pulling portion adapted to be gripped by a conventional pulling tool, as shown and described, for example, in U.S. Pat. No. 3,645,125. The pulling portion of the present fastener is similarly broken off and discarded, as in the prior art grooved fasteners, after the collar is swaged into the grooves. While shank 6 is placed in tension by the pulling tool, so as to force head 8 against the surface of workpiece 2, collar 10 is swaged radially inwardly by the tool mechanism so that it conforms to the external contours of shank 6, thus filling the grooves.

Figure 2:
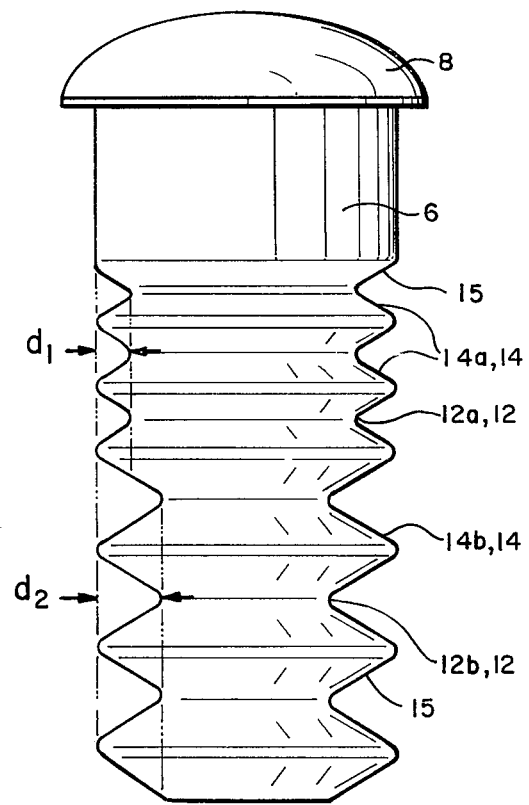
FIG. 2 is a side elevation view of the bolt member shown in FIG. 1.

A bolt in accordance with the present invention is shown in FIG. 2. Two groups of grooves 12a and 12b formed in shank 6 are shown. Grooves 12a and 12b form annular load bearing surfaces or shoulders 14a and 14b, respectively. The respective center lines of the grooves are in planes substantially perpendicular to the longitudinal axis of shank 6.

Grooves 14a are each formed having a radial depth $d_1$ while grooves 14b are each formed having a radial depth $d_2$. In order to achieve the objective of more uniform load distribution along the shank 6, $d_1$ should preferably be less than $d_2$. In a preferred embodiment of the present invention it has been found that the ratio of $d_2/d_1$ should generally be within the range of 1.2 to 1.6.

Although the invention has been shown with each group of grooves 12a and 12b and consisting of three grooves, each group may include a greater number of grooves. It is not necessary that the number of grooves in each group be equal. Although grooves 12 have been shown in the drawings as being symmetrical, it is contemplated that various designs of the present invention may be constructed wherein the grooves in each group and within a particular group may be of different configurations. The spacing between adjacent grooves, the degree of inclination of the load bearing surfaces 14 and their complementary surfaces 15, and other groove parameters may vary without departing from the spirit of the invention.

As previously referred to with regard to conventional grooved fasteners, a substantial portion of the axial load borne by shank 6 is normally carried by the first two grooves adjacent the workpiece 4. This has generally resulted in failure of the shoulders 14 or their mating collar components. One solution has been to make each groove successively deeper and spaced further apart axially in order to strengthen the shoulders 14. However this design approach is more expensive to manufacture and inspect. The present invention also permits the tension to be distributed along the length of the shank, but its configuration is less expensive and more readily manufactured.

While in the foregoing specification and drawings there have been disclosed various embodiments of a fastener in accordance with the present invention, various changes and modifications should be readily apparent to one skilled in the art and are within the intended scope of the invention as recited in the appended claims.

What is claimed is:

1. A fastener adapted to be connected to a member, comprising:
    a head formed to abut the member;
    a shank connected to said head at one end thereof and formed to be placed in an opening in the member, said shank including a first section and a second section, said second section having a first group and a second group of a plurality of adjacent grooves therein for forming annular load bearing surfaces, the depth of said grooves in said first group of grooves being essentially equal and the depth of said grooves in said second group of grooves being essentially equal and the depth of said second group of grooves being greater than the depth of said first group of grooves; and
    a collar adapted to be swaged into said grooves so that said load bearing surfaces abut said collar, said collar having an abutting relationship to the member, thereby placing said shank in tension.

2. The fastener of claim 1 wherein said first group of grooves is positioned between said head and said second group of grooves.

3. The fastener of claim 2 wherein said first group and said second group each form at least three annular load bearing surfaces.

4. The fastener of claim 1, 2 or 3 wherein the ratio of the depth of said second group to said first group is within the range of 1.2 to 1.6.

5. The fastener of claim 1, 2 or 3 wherein the maximum diameter of said annular load bearing surfaces in said second shank section is substantially equal to the diameter of said first shank section.

6. The fastener of claim 1 wherein the center lines of said grooves are substantially perpendicular to the longitudinal axis of said shank.

* * * * *